United States Patent
Kelly

(10) Patent No.: US 9,052,203 B2
(45) Date of Patent: Jun. 9, 2015

(54) METHODS AND APPARATUS FOR LOW-COST INERTIAL DEAD-RECKONING USING CONTEXT DETECTION

(71) Applicant: mCube, Incorporated, San Jose, CA (US)

(72) Inventor: Joseph M. Kelly, Center Point, IA (US)

(73) Assignee: MCUBE, INC., San Jose, CA (US)

(*) Notice: Subject to any disclaimer, the term of this patent is extended or adjusted under 35 U.S.C. 154(b) by 80 days.

(21) Appl. No.: 13/837,411

(22) Filed: Mar. 15, 2013

(65) Prior Publication Data
US 2013/0297203 A1    Nov. 7, 2013

Related U.S. Application Data

(60) Provisional application No. 61/612,248, filed on Mar. 17, 2012.

(51) Int. Cl.
| G01C 21/18 | (2006.01) |
| G01C 21/16 | (2006.01) |
| G01C 21/20 | (2006.01) |
| G01C 21/08 | (2006.01) |

(52) U.S. Cl.
CPC .............. *G01C 21/18* (2013.01); *G01C 21/08* (2013.01); *G01C 21/165* (2013.01); *G01C 21/206* (2013.01)

(58) Field of Classification Search
CPC .................................................... G01C 21/18
USPC .......... 701/454, 500, 461, 525; 342/326, 329, 342/417, 418, 442
See application file for complete search history.

(56) References Cited

U.S. PATENT DOCUMENTS

| 5,457,466 | A  | * | 10/1995 | Rose .............................. 342/442 |
| 6,784,840 | B2 | * | 8/2004  | Menegozzi et al. ........... 342/417 |
| 7,762,135 | B2 | * | 7/2010  | Hertzman et al. .............. 73/509 |
| 8,041,535 | B1 | * | 10/2011 | Kelly et al. .................... 702/151 |
| 8,180,591 | B2 | * | 5/2012  | Yuen et al. ..................... 702/160 |
| 8,217,836 | B1 | * | 7/2012  | Anderson et al. ............. 342/417 |
| 8,311,769 | B2 | * | 11/2012 | Yuen et al. ..................... 702/160 |
| 8,463,577 | B2 | * | 6/2013  | Yuen et al. ..................... 702/160 |
| 8,686,731 | B2 | * | 4/2014  | Zeller et al. .................... 324/326 |
| 8,766,638 | B2 | * | 7/2014  | Nielsen et al. ................. 324/329 |
| 2004/0119640 | A1 | * | 6/2004 | Menegozzi et al. ........... 342/418 |
| 2012/0084053 | A1 | * | 4/2012 | Yuen et al. ..................... 702/160 |
| 2012/0226471 | A1 | * | 9/2012 | Yuen et al. ..................... 702/160 |
| 2013/0297203 | A1 | * | 11/2013 | Kelly ............................. 701/454 |
| 2014/0159730 | A1 | * | 6/2014 | Zeller et al. .................... 324/326 |

* cited by examiner

*Primary Examiner* — Thomas G Black
*Assistant Examiner* — Wae Louie
(74) *Attorney, Agent, or Firm* — Kilpatrick Townsend & Stockton LLP

(57) ABSTRACT

A method for determining a user bearing, implemented on a portable device programmed to perform the method includes determining with a physical sensor of the portable device, a first geometric orientation of the portable device with respect to gravity at a first time, determining with a magnetic sensor of the portable device, a first sensed magnetic field of the portable device in response to an external magnetic field at the first time, determining with the magnetic sensor of the portable device, a second sensed magnetic field of the portable device in response to the external magnetic field at the second time, and determining with the portable device a bearing of the portable device at the second time in response to the first geometric orientation, the first sensed magnetic field, and the second sensed magnetic field.

19 Claims, 5 Drawing Sheets

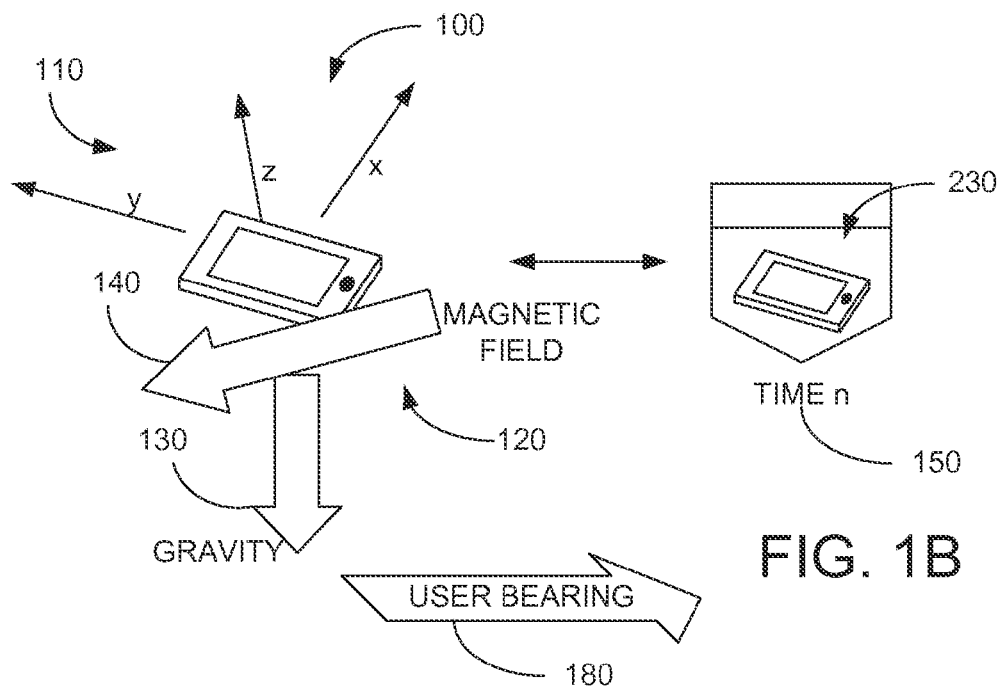
FIG. 1A
FIG. 1B
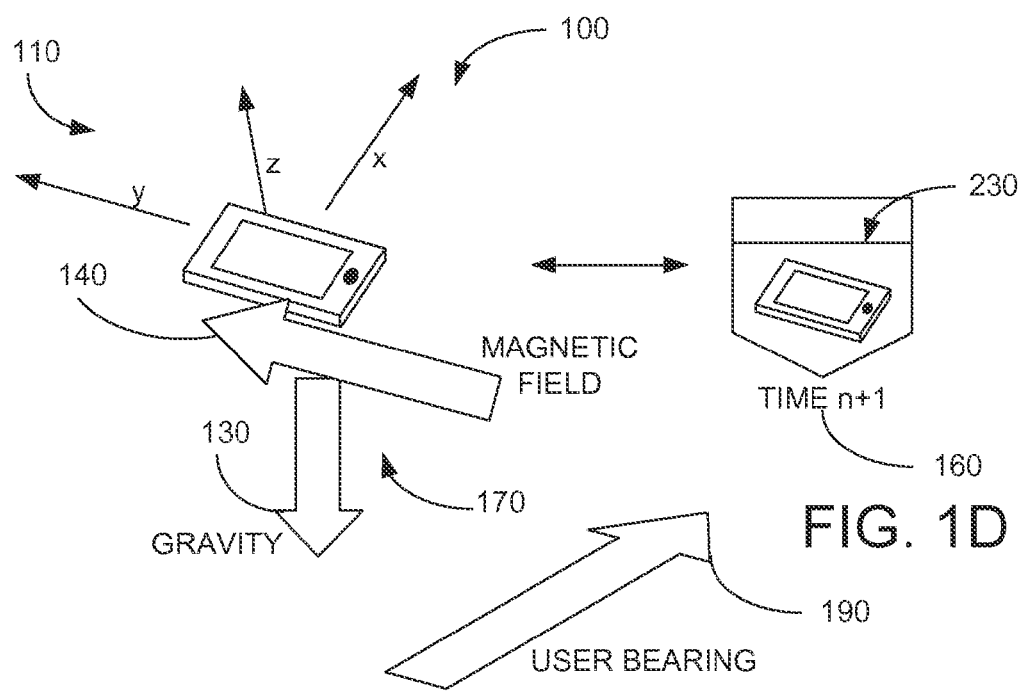
FIG. 1C
FIG. 1D

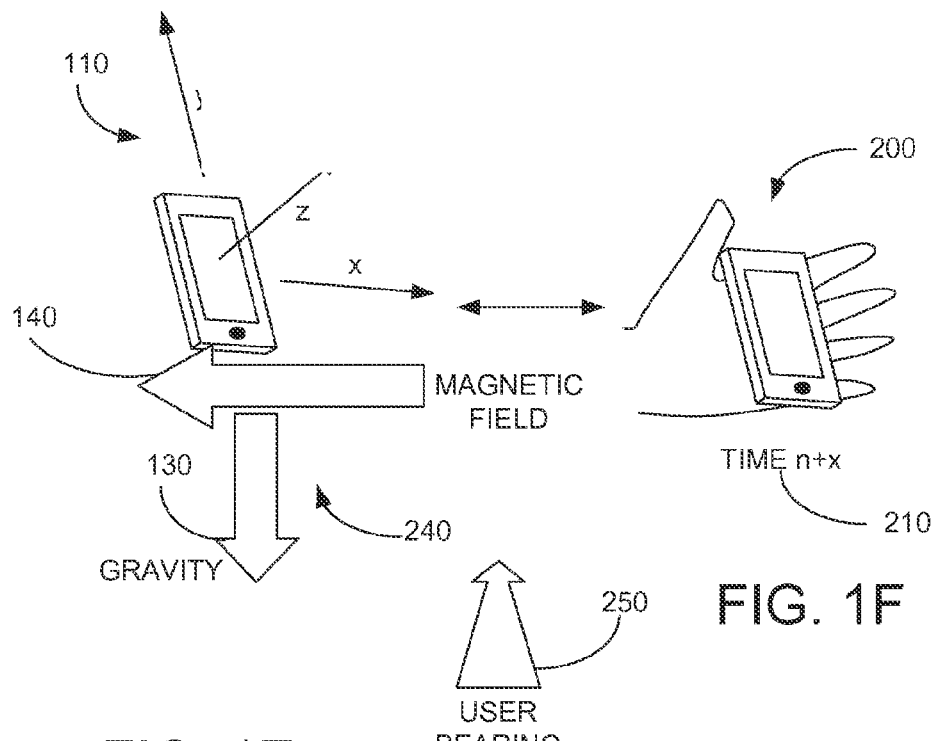
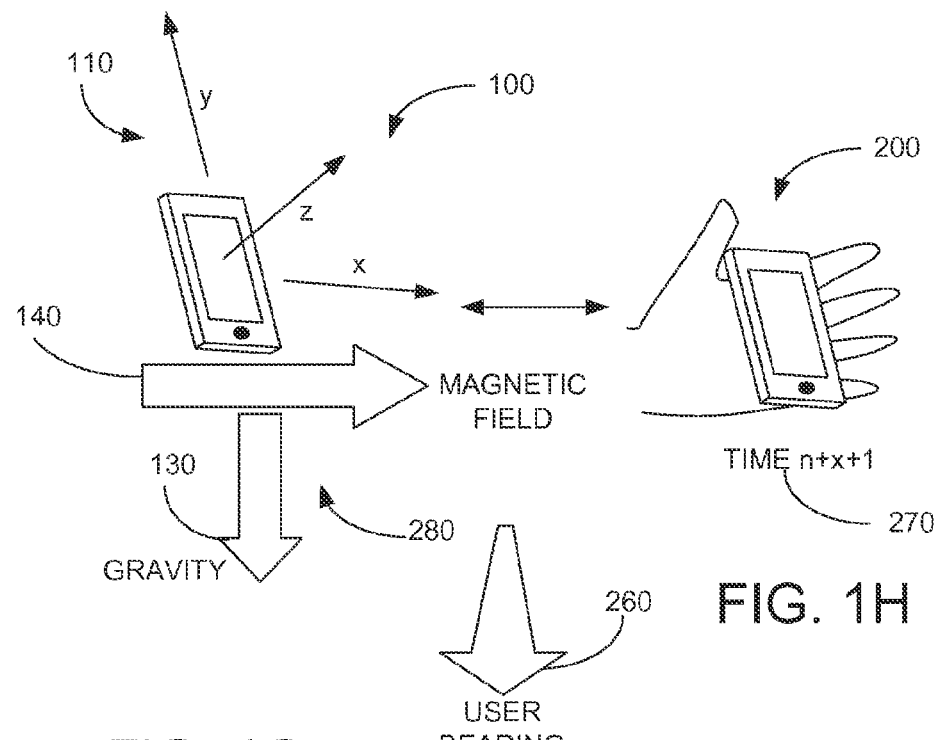

METHODS AND APPARATUS FOR LOW-COST INERTIAL DEAD-RECKONING USING CONTEXT DETECTION

CROSS-REFERENCE TO RELATED APPLICATIONS

The present patent application claims priority to and is a non-provisional of application No. 61/612,248 filed Mar. 17, 2012. That application is incorporated herein by reference, for all purposes.

BACKGROUND

The present invention relates to portable navigation systems. More specifically, embodiments of the present invention relate to low-cost inertial dead-reckoning navigation systems and methods.

Many current outdoor portable navigation systems rely upon signals such as GPS signals, RF (e.g. cell-tower) signals, and the like, to determine the user's location and heading. The inventor believes that such solutions, are often not applicable or useful for indoor navigation. One drawback is that GPS signals and RF signals often do not penetrate deeply into buildings, accordingly such a navigation system may be unreliable. Another drawback is that such signals are often low resolution and are not accurate enough to help a user navigate within an indoor environment where accuracy within feet is often required. Yet another drawback is that such signals typically require power-intensive receivers/processors to provide positional data. Such power-hungry processing would also reduce how long the user could use such a navigation system.

Some current approaches to indoor navigation systems assumes that a user will rely upon a magnetic heading of the device to determine the user heading. It also assumes that the user will keep a device aligned in a specific orientation. By requiring the specific orientation, the magnetic heading of the device will always have a constant relationship to user direction of travel.

While such assumptions may be reasonable to navigation systems affixed to a vehicle, e.g. a shopping cart, a car, the inventor believes these assumptions are unreasonable in the context of hand-held portable navigation systems. More specifically, the inventor believes that for practical indoor navigation applications, it is unrealistic to tell a user to hold the device in a fixed and rigid orientation throughout a store.

Instead, the inventor believes solutions need to be developed that take into account that mobile devices are often held in the pocket, hand, purse, etc., and the location relative to the user can be changed during use depending on how the device is currently being used (phone, music player, video display, game, etc.).

In light of the above, it is desired to have portable navigation systems with reduced power consumption without the drawbacks described above.

BRIEF SUMMARY OF THE INVENTION

The present invention is directed towards portable navigation systems and methods. More specifically, embodiments of the present invention relate to low-cost inertial dead-reckoning navigation systems and methods.

Embodiments of the present invention include determining a physical orientation and a magnetic orientation of a portable device at a first time period. Subsequently, a physical orientation and a magnetic orientation of the portable device at a second time period are determined. In some embodiments, when the physical orientation of the portable device at the first time period are not drastically different than at the second time period, an estimated bearing of a user is determined based upon the differences between the magnetic orientation at the first time period and the second time period. In various embodiments, if the physical orientation of the portable device in the two time periods are drastically different, the process described above is repeated.

In various embodiments, the portable device may include a phone, tablet, PDA, or the like including one or more MEMS devices. MEMS devices may include a three-axis accelerometer, three-axis gyroscope; three-axis magnetometer; and the like. Accordingly, indoor navigation with low power consumption based upon a portable device is provided, whether the device is located in a shirt pocket, pants pocket, in a purse, while held in the hand to make voice calls, send/read text, or user other application, or the like.

According to one aspect of the invention, a method for determining a user bearing, implemented on a portable device programmed to perform the method is described. One technique includes determining with a physical sensor of the portable device, a first geometric orientation of the portable device with respect to gravity at a first time and determining with a magnetic sensor of the portable device, a first sensed magnetic field of the portable device in response to an external magnetic field at the first time. A process may include determining with the magnetic sensor of the portable device, a second sensed magnetic field of the portable device in response to the external magnetic field at the second time, and determining with the portable device a bearing of the portable device at the second time in response to the first geometric orientation, the first sensed magnetic field, and the second sensed magnetic field.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 1A-H illustrate issues considered by the inventors of the present invention;

DETAILED DESCRIPTION OF THE INVENTION

Figure 2A:
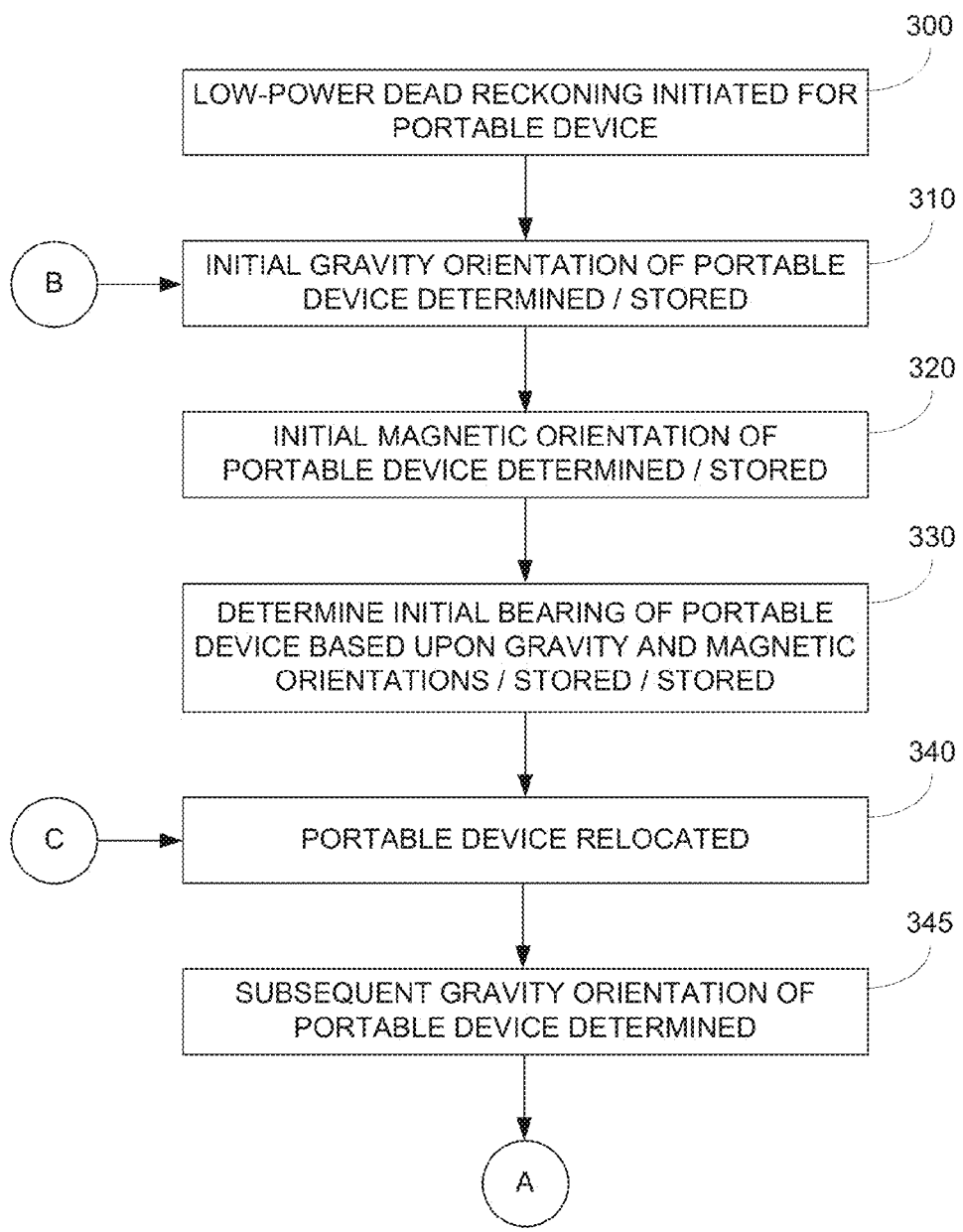
FIGS. 2A-B illustrate a block diagram of a process according to embodiments of the present invention.

FIG. 1A illustrates an example according to various embodiments of the present invention. More specifically a portable device (e.g. cell phone, PDA, tablet computing device, or the like) 100 is illustrated having internal x, y and z-axes 110.

In typical embodiments, portable device 100 is oriented in a first orientation 230 (shown in FIG. 1B) with respect to a user (e.g. in a user's pocket) at a first time period 150.

Additionally, in this example, portable device 100 is also oriented in a first orientation 120 with respect to external forces at a first time period. As shown in FIG. 1A, portable device 100 is oriented with respect to gravity 130, and with respect to a local magnetic field 140, e.g. the Earth's magnetic field.

Next, as illustrated in FIG. 1C, portable device 100 is still approximately oriented in the first orientation 230 (shown in FIG. 1B) with respect to a user (e.g. in a user's pocket) at a second time period 160.

However, in this example, as the user walks around, for example, portable device 100 is now oriented in a second orientation 170 with respect to the external forces at a second time period. As shown in FIG. 1C, portable device 100 is then reoriented with respect to a local magnetic field 140, e.g. the Earth's magnetic field.

In various embodiments of the present invention, the magnetic field readings of portable device 100 while in first orientation 120 are taken (and stored) and then used to estimate the bearing 180 of the user for first time period 150. Next, assuming portable device 100 is still approximately positioned in the first orientation 230 with respect to the user, the magnetic field readings of portable device 100 in the second orientation 170 are taken and used along with the magnetic field readings of the portable device 100 in the first orientation 120 to estimate the bearing 190 of the user for the second time period 160.

In FIG. 1E, in various embodiments of the present invention, portable device 100 may be sensed to have a second orientation 200 with respect to the user. For example, portable device 100 may be taken out of a pocket and held in the hand to answer a call, to access data, etc; portable device 100 may be in a carrying bag and the user may switch carrying the bag from the right shoulder to the left shoulder; or the like.

In some embodiments, when the first orientation 230 is somewhat different from second orientation 200, the third orientation 240 of portable device 100 is determined with respect to gravity 130 and magnetic field 140 to determine a bearing 250 at a third time period 210.

In FIG. 1G, similar to the above, assuming that portable device 100 is maintained in the second orientation 200 (shown in FIG. 1H) with respect to the user, a bearing of the user 260 at a fourth time period 270 can be determined. In various embodiments, the magnetic field readings of portable device 100 in the fourth orientation 280 are taken and used along with the magnetic field readings of the portable device 100 in the third orientation 240 to estimate the bearing 260 of the user for the fourth time period 270.

Figure 2B:
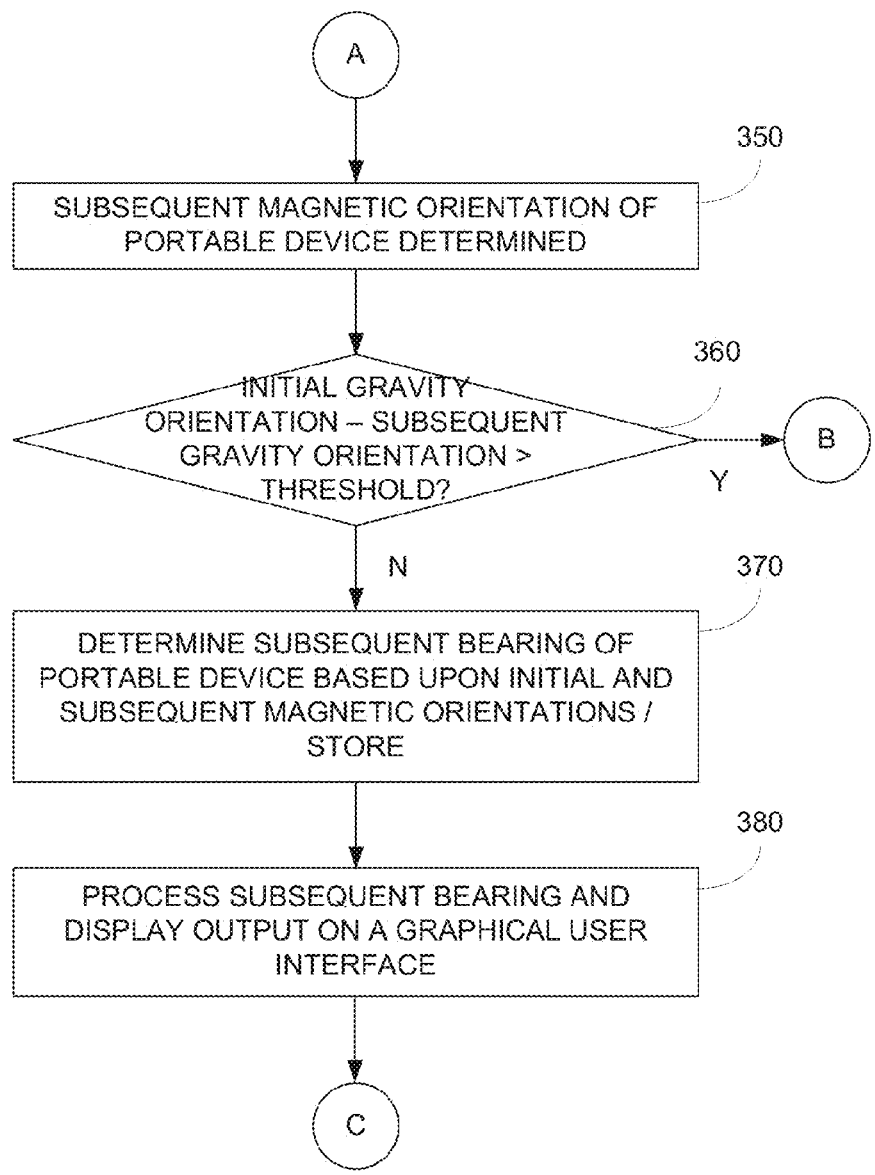

FIGS. 2A-B illustrate a flow chart according to various embodiments of the present invention. Various embodiments of the present invention are applicable to dead reckoning systems that need not rely on external data sources such as hot spots, beacons, satellite signals, or other source requiring high power consumption.

Initially, the low power dead reckoning system is initiated, step 300. In some embodiments, the user may specifically initiate this functionality, but in other embodiments, this type of system may be automatically initiated. As examples of the latter, when low power consumption is desired, when navigating indoors, or the like. In various embodiments, if the physical sensors described herein, e.g. accelerometers, gyroscopes, magnetometers, pressure sensors, or the like, have not been activated, these sensors are powered-up.

Next, in some embodiments, an orientation of the portable device is determined at a first time period and saved, step 310. As described above, the orientation of the device may be determined by determining the effect of gravity on the portable device, via accelerometers, gyroscopes, or the like.

In some embodiments, concurrently with the above step 310, or at approximately the first time period, the effect of a local magnetic field (e.g., global magnetic field) is measured on the portable device, via a magnetometer, or the like, step 320. In various embodiments, the magnetometer may measure magnetic fields in three-directions.

Based upon the measurements of the orientation of the portable device with respect to gravity and with respect to magnetic north, an initial or first bearing of user of the portable device, is determined, step 330. In various embodiments, the initial bearing is associated with the first time period, and in subsequent iterations, the initial bearing is associated with the next time period, as will be discussed below.

In some embodiments, the first bearing may be set by the user. For example, the user may indicate a location and/or direction they are facing with regards to a landmark on a map or the like. Some typical examples may include; the user indicating they are facing a particular store (e.g. GAP), they are in a particular escalator or elevator; they are in a particular hallway or entering a specific entrance or gate (e.g. Gate 4B); or the like. In some embodiments, the first bearing may be determined based upon a user capture of a bar code, QR code, specific image (e.g. specific picture in an art gallery), or the like with the portable device. In still other embodiments, the first bearing maybe determined based upon external data sources such as WiFi signals, GPS signals, RFID signals, Bluetooth signals, sonic signals, NFC signals, or other localization methods the like.

Next, the user moves a portable device, e.g. walking within a building, running on a sidewalk, biking on a street, or the like, step 340. In some embodiments, an orientation of the portable device is determined with respect to gravity at approximately a second time period, step 345. As described above, the orientation of the device may be determined by determining the effect of gravity on the portable device, via accelerometers, gyroscopes, or the like. Additionally, at approximately a second time period, the effect of a local magnetic field (e.g. global magnetic field) is measured on the portable device, via the magnetometer, or the like, step 350.

In some embodiments, a comparison is made between the orientation of the portable device at approximately the first time period versus the second time period, step 360. In some embodiments, when the differences between the orientation of the portable device at the first time period versus around the second time exceeds the threshold in step 360, it is assumed that the orientation of the portable device with respect to the user has been greatly changed, and the process resets and continues to step 310. For example, a tablet may be hand held at the first time period, and may be stored in a backpack in a second time period; a phone may be moved from a left pocket at the first time period to a right pocket at the second time period; or the like. If the differences are within a threshold, the process continues to step 370, In some embodiments, if the difference threshold is not exceeded, the magnetic field measured at approximately the first time period and the initial bearing is compared to the magnetic field measured at approximately the second time period, to determine an estimate of a second compass bearing for the user at approximately the second time period, step 370. A process for determining the second compass bearing is described below:

In various embodiments, the equations for the required computations are given here:

$$\psi_{heading\_change} = \text{arctangent}\{\sin(\psi_{heading\_change}) \cdot \cos(\psi_{heading\_change})\}$$

$$\sin(\psi_{heading\_change}) = \frac{(H_0 \times H_1) \cdot \hat{Z}}{\|H_0\| \|H_1\|}$$

-continued $$\cos(\psi_{heading\_change}) = \frac{H_0 \cdot H_1}{\|H_0\|\|H_1\|}$$

where:

$$H_0 = H_{horizontal}(t=0)$$

$$H_1 = H_{horizontal}(t=t_1)$$

At each point in time, the following computation may be used:

$$H_{horizontal} = H_{leveled} - \hat{z} \cdot H_{leveled}$$

$$H_{leveled} = C_b^{level} H_{measured}$$

where $C_b^{level}$ is the direction cosine matrix that puts the magnetic field measurements from device/sensor axes ($H_{measured}$) into a locally level coordinate system. It is derived from pitch ($\theta$) and roll ($\phi$) estimates (e.g. orientation of the portable device with respect to gravity) of the device using:

$$C_b^{level} = \begin{bmatrix} \cos(\theta) & \sin(\phi)\sin(\theta) & \cos(\phi)\sin(\theta) \\ 0 & \cos(\phi) & -\sin(\phi) \\ -\sin(\theta) & \sin(\phi)\cos(\theta) & \cos(\phi)\cos(\theta) \end{bmatrix}$$

Pitch and roll are themselves computed using one or both of accelerometer and gyro measurements from the device. Other rotation matrices and coordinate systems can be used so long as they are mathematically consistent; the goal is only to isolate magnetic field components that are orthogonal to the local gravity vector (local vertical). The local vertical, $\hat{z}$, for the level coordinate system employed in this example is:

$$\hat{Z} = \begin{bmatrix} 0 \\ 0 \\ 1 \end{bmatrix}$$

however the vector expressions given for computing $\Psi_{heading\_change}$ are valid in any chosen coordinate system.

Next, based upon the compass bearing at approximately the second time period may be output to the user via a compass-type graphical user interface, step 380. In other embodiments, the second compass bearing is provided to a mapping program or application running upon the portable device. In response, the mapping program may update a position and heading of the user on a map, and/or provide updated navigation instructions to the user, accordingly.

In still other embodiments, the user bearing may be combined with one or more user-step algorithms (e.g. horizontal motion detection) for a dead-reckoning positioning system. Such embodiments may then be used to estimate a location of the user at the second time period. For example, some embodiments may estimate that the user takes two steps facing north, two steps facing east, one step facing south and one step facing west, and accordingly the user can be estimated to be one step north and one step east of their initial location.

In various embodiments, the estimate of the second compass bearing and the magnetic field measured at approximately the second time period are then used as first time period data, as the process described above then repeats. More specifically, in some embodiments, the process may proceed back to step 340.

In some embodiments, the initial time period and successive time periods may be periodic, for example, be every second, five seconds, ten seconds, or the like. In some embodiments, the frequency may affect accuracy of the user bearing estimates, and/or battery life.

Figure 3:
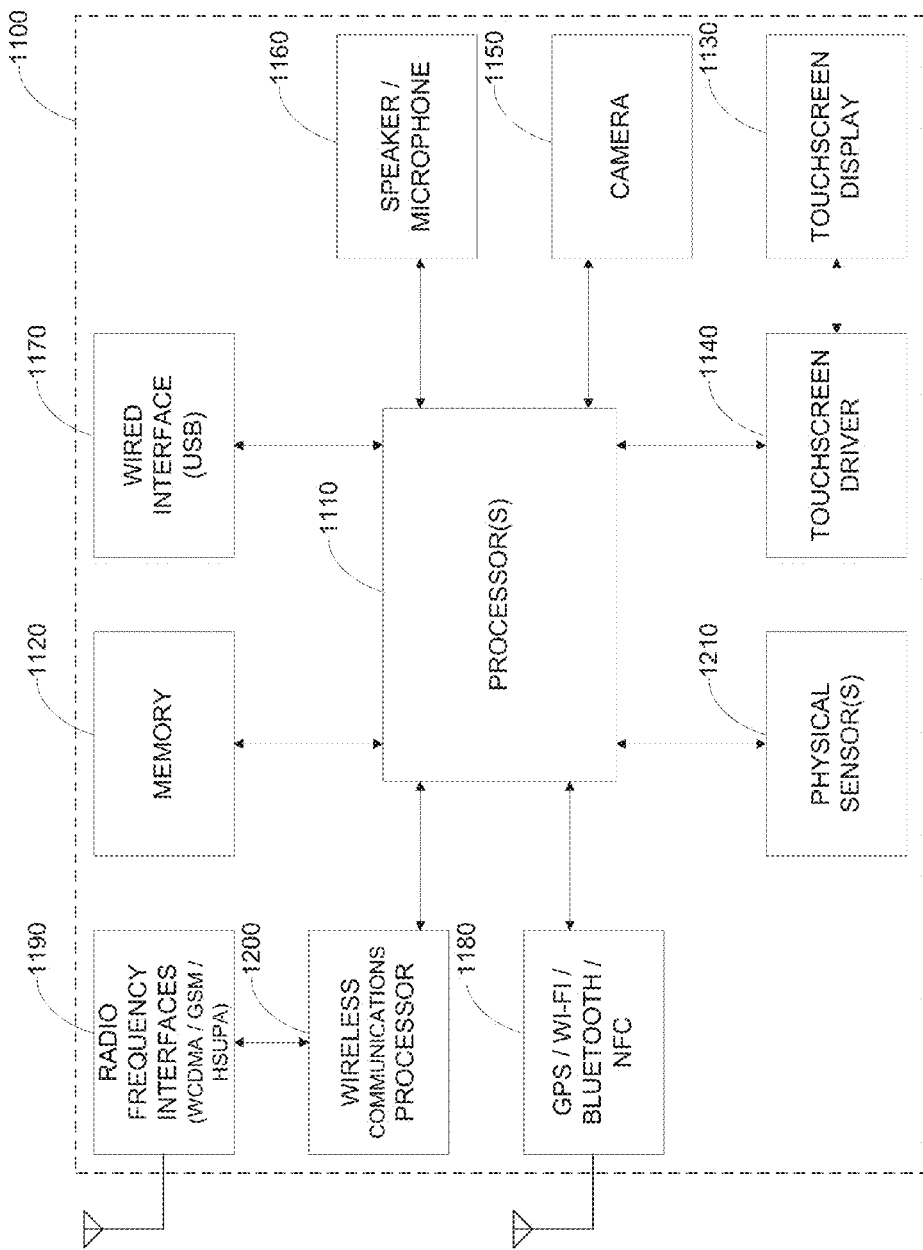
FIG. 3 illustrates a block diagram of a process for fabrication embodiments of the present invention.

FIG. 3 illustrates a functional block diagram of various embodiments of the present invention. In FIG. 3, a computing device 400 typically includes an applications processor 410, memory 420, a touch screen display 430 and driver 440, an image acquisition device 450, audio input/output devices 460, and the like. Additional communications from and to computing device are typically provided by via a wired interface 470, a GPS/Wi-Fi/Bluetooth interface 480, RF interfaces 490 and driver 500, and the like. Also included in various embodiments are physical sensors 510.

In various embodiments, computing device 400 may be a hand-held computing device (e.g. Apple iPad, Apple iTouch, Lenovo Skylight/IdeaPad, Asus EEE series, Microsoft 8 tablet, Samsung Galaxy Tab, Android Tablet), a portable telephone (e.g. Apple iPhone, Motorola Droid series, Google Nexus S, HTC Sensation, Samsung Galaxy S series, Nokia Lumina series), a portable computer (e.g. netbook, laptop, ultrabook), a media player (e.g. Microsoft Zune, Apple iPod), a reading device (e.g. Amazon Kindle Fire, Barnes and Noble Nook), or the like.

Typically, computing device 400 may include one or more processors 410. Such processors 410 may also be termed application processors, and may include a processor core, a video/graphics core, and other cores. Processors 410 may be a processor from Apple (A4/A5), Intel (Atom), NVidia (Tegra 3, 4, 5), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR -SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 420 may include different types of memory (including memory controllers), such as flash memory (e.g. NOR, NAND), pseudo SRAM, DDR SDRAM, or the like. Memory 420 may be fixed within computing device 400 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 430 and driver 440 may be based upon a variety of later-developed or current touch screen technology including resistive displays, capacitive displays, optical sensor displays, electromagnetic resonance, or the like. Additionally, touch screen display 430 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 450 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 460 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 410 to enable the user to operate computing device 400 by stating voice commands. Additionally, a speech engine may be provided in various embodiments to enable computing device 400 to provide audio status messages, audio response messages, or the like.

In various embodiments, wired interface 470 may be used to provide data transfers between computing device 400 and an external source, such as a computer, a remote server, a storage network, another computing device 400, or the like. Such data may include application data, operating system data, firmware, or the like. Embodiments may include any later-developed or conventional physical interface/protocol, such as: USB 4.0, 5.0, micro USB, mini USB, Firewire, Apple iPod connector, Ethernet, POTS, or the like. Additionally, software that enables communications over such networks is typically provided.

In various embodiments, a wireless interface 480 may also be provided to provide wireless data transfers between computing device 400 and external sources, such as computers, storage networks, headphones, microphones, cameras, or the like. As illustrated in FIG. 3, wireless protocols may include Wi-Fi (e.g. IEEE 802.11 a/b/g/n, WiMax), Bluetooth, IR, near field communication (NFC), ZigBee and the like.

GPS receiving capability may also be included in various embodiments of the present invention, however is not required. As illustrated in FIG. 3, GPS functionality is included as part of wireless interface 480 merely for sake of convenience, although in implementation, such functionality is currently performed by circuitry that is distinct from the Wi-Fi circuitry and distinct from the Bluetooth circuitry.

Additional wireless communications may be provided via RF interfaces 490 and drivers 500 in various embodiments. In various embodiments, RF interfaces 490 may support any future-developed or conventional radio frequency communications protocol, such as CDMA-based protocols (e.g. WCDMA), GSM-based protocols, HSUPA-based protocols, or the like. In the embodiments illustrated, driver 500 is illustrated as being distinct from applications processor 410. However, in some embodiments, these functionality are provided upon a single IC package, for example the Marvel PXA330 processor, and the like. It is contemplated that some embodiments of computing device 400 need not include the RF functionality provided by RF interface 490 and driver 500.

FIG. 3 also illustrates computing device 400 to include physical sensors 510. In various embodiments of the present invention, physical sensors 510 are multi-axis Micro-Electro-Mechanical Systems (MEMS) based devices being developed by M-cube, the assignee of the present patent application. Physical sensors 510 developed by M-cube, the assignee of the present patent application, currently include very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof.

Various embodiments may include an accelerometer with a reduced substrate displacement bias, as described above. Accordingly, using such embodiments, computing device 400 is expected to have a lower sensitivity to temperature variations, lower sensitivity to production/assembly forces imparted upon to an accelerometer, faster calibration times, lower production costs, and the like.

As described in the patent applications referenced above, various embodiments of physical sensors 510 are manufactured using a foundry-compatible process. As explained in such applications, because the process for manufacturing such physical sensors can be performed on a standard CMOS fabrication facility, it is expected that there will be a broader adoption of such components into computing device 400. In other embodiments of the present invention, conventional physical sensors 510 from Bosch, STMicroelectronics, Analog Devices, Kionix or the like may be used.

In various embodiments, any number of future developed or current operating systems may be supported, such as iPhone OS (e.g. iOS), WindowsMobile (e.g. 7, 8), Google Android (e.g. 5.x, 4.x), Symbian, or the like. In various embodiments of the present invention, the operating system may be a multi-threaded multi-tasking operating system. Accordingly, inputs and/or outputs from and to touch screen display 430 and driver 440 and inputs/or outputs to physical sensors 510 may be processed in parallel processing threads. In other embodiments, such events or outputs may be processed serially, or the like. Inputs and outputs from other functional blocks may also be processed in parallel or serially, in other embodiments of the present invention, such as image acquisition device 450 and physical sensors 510.

FIG. 3 is representative of one computing device 400 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 3. For example, in various embodiments, computing device 400 may lack image acquisition unit 450, or RF interface 490 and/or driver 500, or GPS capability, or the like. Additional functions may also be added to various embodiments of computing device 400, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for determining a user bearing, implemented on a portable device programmed to perform the method comprising:
  determining, with a physical sensor of the portable device, a first geometric orientation of the portable device with respect to gravity at a first time;
  determining, with a magnetic sensor of the portable device, a first sensed magnetic field of the portable device in response to an external magnetic field at the first time;
  determining, with the magnetic sensor of the portable device, a second sensed magnetic field of the portable device in response to the external magnetic field at a second time; and
  determining, with the portable device, a first change in bearing of the portable device at the second time in response to the first geometric orientation, the first sensed magnetic field, and the second sensed magnetic field;
  wherein determining with the portable device the first change in bearing comprises determining a change in angle about an external vertical axis between a horizontal component of the first sensed magnetic field with respect to an internal horizontal axis and a horizontal component of the second sensed magnetic field with respect to the internal horizontal axis;
  wherein the horizontal component of the first sense magnetic field being determined from a first measured horizontal component, a local gravity vector, and a direction cosine matrix; and
  wherein the horizontal component of the second sensed magnetic field being determined from a second measured horizontal component, the local gravity vector, and the direction cosine matrix.

2. The method of claim 1 further comprising:
  determining, with the physical sensor of the portable device, a second geometric orientation of the portable device with respect to gravity at a third time;
  determining whether the second geometric orientation exceeds a difference threshold with respect to the first geometric orientation;
  if the second geometric orientation exceeds the difference threshold, the method includes:
  determining, with the physical sensor of the portable device, a third geometric orientation of the portable device with respect to gravity at a fourth time;
  determining, with the magnetic sensor of the portable device, a third sensed magnetic field of the portable device in response to an external magnetic field at a fourth time
  determining, with the magnetic sensor of the portable device, a fourth sensed magnetic field of the portable device in response to the external magnetic field at a fifth time; and
  determining, with the portable device, a second change in bearing of the portable device in response to the third geometric orientation, the third sensed magnetic field, and the fourth sensed magnetic field.

3. The method of claim 2 wherein the third time is substantially the same as the fourth time.

4. The method of claim 1 wherein the physical sensor is selected from a group consisting of: an accelerometer, a gyroscope, a three-axis accelerometer, a three-axis gyroscope.

5. The method of claim 1 wherein the magnetic sensor comprises a three-axis magnetic sensor.

6. The method of claim 1 wherein determining the change in bearing comprises determining an inverse tangent function using a heading change sine function and a heading change cosine function, the both of these functions using the first and second measured horizontal components.

7. The method of claim 1 further comprising:
  determining, with the physical sensor of the portable device, a plurality of physical perturbations between the first time and the second time;
  determining, with the portable device, an estimate of a distance of the portable device between the first time and the second time.

8. The method of claim 1 further comprising:
  determining, with the portable device, an estimate of a position of the portable device at the second time, in response to the change in bearing and to the distance.

9. A portable device for determining a user bearing comprising:
  a physical sensor configured to determine a first geometric orientation of the portable device with respect to gravity at a first time;
  a magnetic sensor configured to determine a first sensed magnetic field of the portable device in response to an external magnetic field at the first time, wherein the magnetic sensor is configured to determine a second sensed magnetic field of the portable device in response to the external magnetic field at the second time, wherein the first time and the second time are different; and
  a processor coupled to the physical sensor and the magnetic sensor, wherein the processor is programmed to determine a first change in bearing of the portable device at the second time in response to the first geometric orientation, the first sensed magnetic field, and the second sensed magnetic field;
  wherein the processor is programmed to determine a change in angle about an external vertical axis between a horizontal component of the first sensed magnetic field with respect to an internal horizontal axis and a horizontal component of the second sensed magnetic field with respect to the internal horizontal axis;
  wherein the processor is programmed to determine the horizontal component of the first sense magnetic field from a first measured horizontal component, a local gravity vector, and a direction cosine matrix; and
  wherein processor is programmed to determine the horizontal component of the second sensed magnetic field from a second measured horizontal component, the local gravity vector, and the direction cosine matrix.

10. The device of claim 9
  wherein the physical sensor is configured to determine a second geometric orientation of the portable device with respect to gravity at a third time;
  wherein the physical sensor is configured to determine a third geometric orientation of the portable device with respect to gravity at a fourth time;
  wherein the magnetic sensor is configured to determine a third sensed magnetic field of the portable device in response to an external magnetic field at the fourth time;
  wherein the magnetic sensor is configured to determine a fourth sensed magnetic field of the portable device in response to the external magnetic field at the fifth time; and
  wherein the processor is programmed to determine whether the second geometric orientation exceeds a difference threshold with respect to the first geometric orientation, wherein when the second geometric orientation is determined to exceed the difference threshold, the processor is programmed to determine a second change in bearing of the portable device in response to the third geometric orientation, the third sensed magnetic field, and the fourth sensed magnetic field.

11. The device of claim 10 wherein the third time and the fourth time are substantially coincident.

12. The device of claim 9 wherein the physical sensor is selected from a group consisting of: an accelerometer, a gyroscope, a three-axis accelerometer, a three-axis gyroscope.

13. The device of claim 9 wherein the magnetic sensor comprises a three-axis magnetic sensor.

14. The device of claim 9 wherein the processor is programmed to determine the change in bearing via determining an inverse tangent function using a heading change sine function and a heading change cosine function, the both of these functions using the first and second measured horizontal components.

15. The device of claim 14 wherein the processor is programmed to determine as estimate of a position of the portable device at the second time, in response to the change in bearing and to the distance.

16. The device of claim 9 wherein the physical sensor determines a plurality of physical perturbations between the first time and the second time; and wherein the processor is programmed to determine an estimate of a distance of the portable device between the first time and the second time.

17. The device of claim 9 further comprising a memory configured to store a representation of a map.

18. The device of claim 17 wherein the processor is programmed to determine a display representation of at least a portion of the map; and wherein the processor is programmed to determine an icon in response to the first change in bearing.

19. The device of claim 18 further comprising a display coupled to the processor, wherein the display is configured to display the display representation of at least the portion of the map and the icon.

* * * * *